No. 734,008. PATENTED JULY 21, 1903.
C. S. THOMPSON.
BICYCLE GEARING.
APPLICATION FILED JULY 15, 1902.
NO MODEL. 2 SHEETS—SHEET 1.
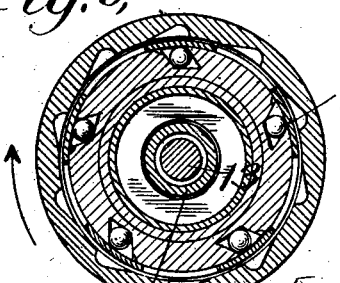
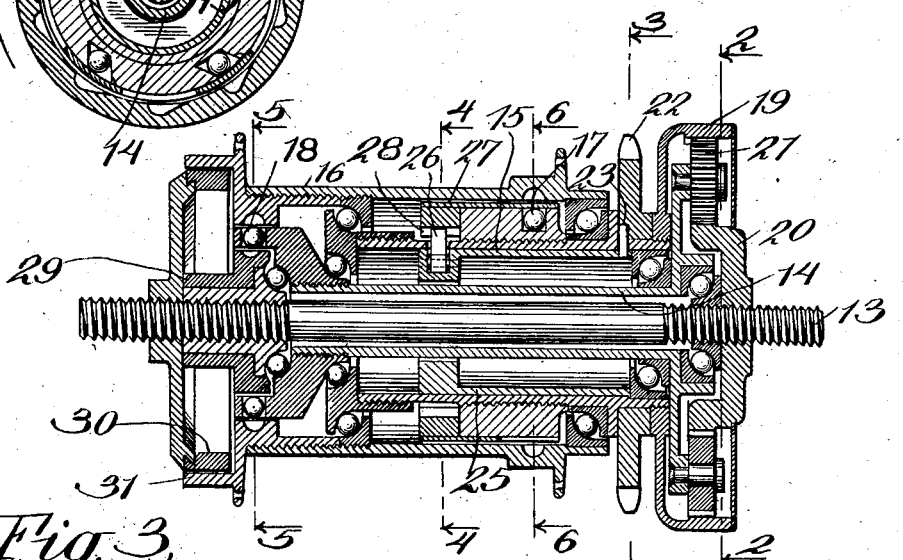
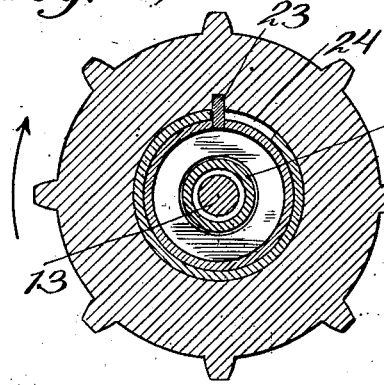
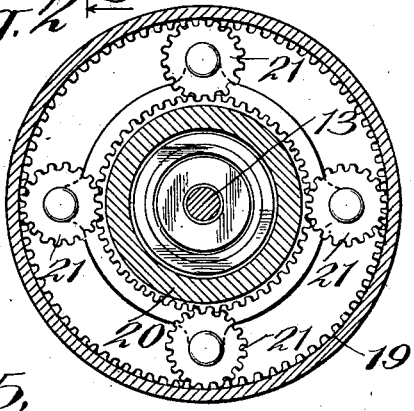
WITNESSES: INVENTOR
C. S. Thompson
BY
ATTORNEYS.

No. 734,008. PATENTED JULY 21, 1903.
C. S. THOMPSON.
BICYCLE GEARING.
APPLICATION FILED JULY 15, 1902.
NO MODEL. 2 SHEETS—SHEET 2.
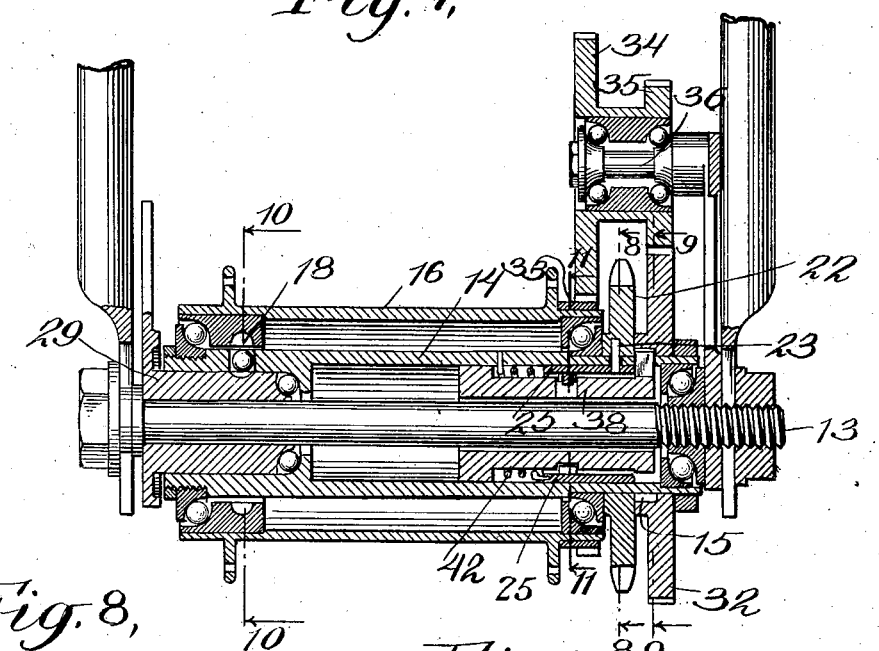
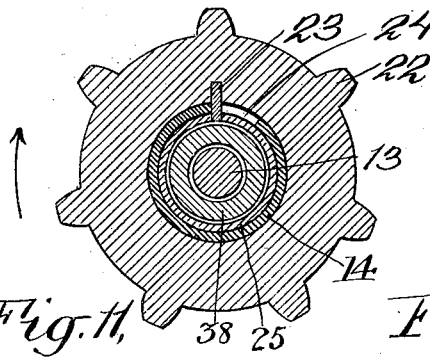
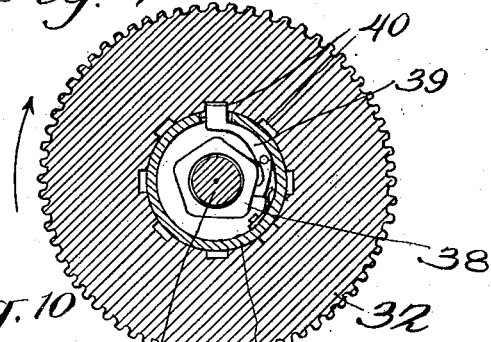
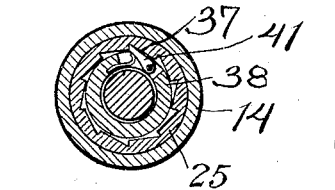
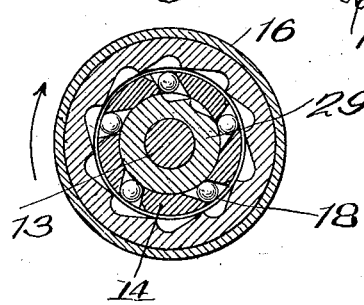
WITNESSES:
M. M. Conover.
R. W. Cushley.
INVENTOR
C. S. Thompson
BY
Chapin Hayward & Marble
his ATTORNEYS.
THE NORRIS PETERS CO., PHOTO-LITHO., WASHINGTON, D. C.

No. 734,008.

Patented July 21, 1903.

UNITED STATES PATENT OFFICE.

CHARLES S. THOMPSON, OF ELIZABETH, NEW JERSEY.

BICYCLE-GEARING.

SPECIFICATION forming part of Letters Patent No. 734,008, dated July 21, 1903.

Application filed July 15, 1902. Serial No. 115,631. (No model.)

*To all whom it may concern:*

Be it known that I, CHARLES S. THOMPSON, a citizen of the United States of America, and a resident of Elizabeth, in the county of Union and State of New Jersey, have invented certain new and useful Improvements in Bicycle-Gearing, of which the following is a specification, reference being had to the accompanying drawings, forming a part thereof.
My invention relates to bicycle-gearing, and particularly to change-speed mechanism therefor.

My invention consists in certain improved change-speed-gearing mechanism for bicycles in which the operation of changing from one speed to another is automatically effected, of a brake mechanism in combination with such gearing which may also be automatically applied, in means whereby the driving mechanism may be in fixed locked engagement with the wheel to be driven for both forward and back pedaling when desired, and in disengaging means whereby the bicycle may be allowed to run entirely free of its driving mechanism when desired.

The objects of my invention are to provide a two-speed gearing for a bicycle, means whereby the wheel may be permitted to run free, means for operatively back-pedaling, and means for applying a brake, all operated and controlled by relative movements of the driving means with respect to the wheel to be driven, so that the bicycle will be at all times under complete control of the rider, and changes may be made from one speed to another or for running the wheel free or for back pedaling or for applying the brake, all by movements of the pedals only and without the employment of levers or kindred devices manually or otherwise operated independently of the ordinary movements of the feet in pedaling.

My invention is particularly adapted to chain-driven machines, and in the embodiment of my invention illustrated and described herein I have shown it in such connection.

It will of course be understood that my invention is equally applicable to chainless machines—as, for instance, the well-known bevel-gear machines—and that any changes that might be necessary to adapt my present invention to a machine of the bevel-gear type would be such in view of the art as to be within the skill of a mechanic and would not require invention.

My invention also consists in certain details of construction and combination of parts, as will be hereinafter more fully set forth, and other advantages will appear hereinafter.

I will now proceed to describe bicycle-gearing embodying my invention and will then point out the novel features in claims.

In the drawings, Figure 1 is a view in central longitudinal section of a mechanism embodying my invention. Fig. 2 is a view in transverse section thereof, the section being taken upon the plane of the line 2 2 of Fig. 1. Fig. 3 is a similar view in transverse section, the section being taken upon the plane of the line 3 3 of Fig 1. Fig. 4 is a similar view in transverse section, the section being taken upon the plane of the line 4 4 of Fig. 1. Fig. 5 is a similar view in transverse section, the section being taken upon the plane of the line 5 5 of Fig. 1. Fig. 6 is a similar view in transverse section, the section being taken upon the plane of the line 6 6 of Fig. 1. Fig. 7 is a view in central longitudinal section of a mechanism embodying my invention, showing some modifications of structure and illustrating a construction by which the driving mechanism may remain in engagement with the driven member in both forward and backward movements of the driving member. Fig. 8 is a view in transverse section thereof, the section being taken upon the plane of the line 8 8 of Fig. 7. Fig. 9 is a similar view in transverse section, the section being taken upon the plane of the line 9 9 of Fig. 7. Fig. 10 is a similar view in transverse section, the section being taken upon the plane of the line 10 10 of Fig. 7. Fig. 11 is a similar view in transverse section, the section being taken upon the plane of the line 11 11 of Fig. 7.

I will first describe the mechanism illustrated in Figs 1 to 6, inclusive, of the drawings, designating the various parts therein by reference characters.

13 designates the stationary axle of the rear or driving wheel of a bicycle, which axle may be supported by the bicycle-frame in the usual manner. A sleeve 14 surrounds the said axle and is suitably mounted to rotate freely upon ball-bearings thereon. This sleeve 14 I will hereinafter refer to as the "slow-speed sleeve" or "secondary driving member." Another sleeve 15 surrounds the said sleeve 14 and is mounted to rotate freely thereon upon suitable ball-bearings. This sleeve 15 I will hereinafter refer to as the "high-speed sleeve" or "primary driving member." A hub 16 surrounds the axle and the two sleeves 14 and 15, such hub being the hub of the rear or driving wheel of the bicycle, and suitable ball-bearings are arranged between the said high-speed sleeve 15 and the hub 16, so that the hub may turn thereon. The hub 16 carries one member of a clutch 17 and also one member of a clutch 18. The other member of the clutch 17 is carried by the high-speed sleeve 15, and hence I will hereinafter refer to the clutch 17 as the "high-speed clutch." The other member of the clutch 18 is carried by the slow-speed sleeve 14, and hence I will hereinafter refer to the clutch 18 as the "slow-speed clutch."

The high-speed sleeve 15 has rigidly secured thereto an internal gear-wheel 19, and the stationary axle 13 has rigidly secured thereto a gear-wheel 20. The slow-speed sleeve 14 carries one or more planetary pinions 21, mounted to rotate freely upon their axes and having their teeth in engagement with the internal teeth of the gear-wheel 19 and the external teeth of the gear-wheel 20.

A sprocket-wheel 22 or other power-transmitting gear is mounted upon the high-speed sleeve and has a limited movement thereon, such movement being restricted by means of a pin or key 23, which is secured to the sprocket-wheel 22 and arranged to have a limited movement in a slot 24 in the high-speed sleeve 15, as will be understood more readily by reference to Figs. 1 and 3 of the drawings. The inner end of the pin or key 23 is secured to a shell 25, and a pawl 26 is carried by the said shell at the opposite end thereof, to which are secured the key 23 and the sprocket-wheel 22. (See more particularly Fig. 4.)

A ball-retaining sleeve 27 is mounted upon and carried by the high-speed sleeve 15. The ball-retaining sleeve is located adjacent to the high-speed clutch 17 and is provided with a number of slots or cut-away portions corresponding to the number of the balls employed in the clutch. In the present embodiment of my invention there are five balls shown (see Fig. 6) and there are five corresponding cut-away portions in the ball-retaining sleeve. When the sleeve is turned in such a position that the portions that are not cut away are opposite the balls, such portions will retain the balls in the pocket provided therefor in the high-speed sleeve. When the ball-retaining sleeve is moved with respect to the high-speed sleeve, so that the cut-away portions thereof come opposite the balls, the said balls will be released and permitted to assume an operative postion between the high-speed sleeve and the hub 16, so that the two may be in operative connection. The ball-retaining sleeve 27 at that end opposite to the end having the cut-away portions is provided with a plurality of internal teeth 28, in this instance 10, to correspond with the cut-away portions of the ball-retaining sleeve 27 and the portions between them before referred to. The pawl 26 is adapted to engage the said teeth, as clearly shown in Figs. 1 and 4, and a movement backward and forward of the power-transmitting member or sprocket-wheel 22 and its shell 25 with respect to the high-speed sleeve 15 to the full limit of the movement allowed by the key 23 in the slot 24 will be sufficient to cause the pawl 26 to engage the next succeeding tooth 28 of the ball-retaining sleeve 27 and to revolve the said ball-retaining sleeve upon its support one-tenth of a revolution to throw the clutch 17 into or out of operation in accordance with the position in which it was last set.

When the parts are in the position in which they are shown in Figs. 1 and 6 of the drawings, the balls of the clutch 17 will be retained in their pockets, and the said clutch will be in an inoperative position. The driving connection between the sprocket-wheel 22 and the hub 16 will then be through the internal gear 19, planetary gears 21, (which by engagement with the stationery gear 20 will cause the rotation of the slow-speed sleeve 14 at a slower speed than the high-speed sleeve 15, the ratio thereof being determined by the diameter of the stationary gear 20 and that of the rotative gear 19,) the slow-speed sleeve 14, and through the clutch 18 to the hub 16. When it is desired to change the speed at which the wheel is to be driven, it is merely necessary to permit the wheel to slightly overrun the driving mechanism, so that the sleeve 15 will be caused to advance with relation to the sprocket-wheel a distance equal to the length of the slot 24 or, in other words, a distance of about one-tenth of a revolution. This will cause the pawl 26 to pick up a new tooth of the ball-retaining sleeve, and if forward movement of the sprocket-wheel be then made, so as to cause the ball-retaining sleeve to be advanced one-tenth of a revolution to release the balls of the clutch 17, the clutch 17 will immediately become operative and driving connection will be made between the high-speed sleeve 15 and the hub 16 directly. The gearing will then be changed to the high speed, and at such times though the slow-speed sleeve will of course be rotated through the planetary gearing, as before, the clutch 18 will be overrun, and hence will be inoperative. A change back again to the slow speed may be made in a similar manner by again permitting the wheel to overrun and then catching up with it to again advance the ball-retaining sleeve to throw the balls of the clutch 17 out of operation, when power will again be transmitted to the hub through the gearing and the clutch 18, as before. It will thus be seen that to change from either gear to the other it is merely necessary to permit the wheel to momentarily overrun the driving mechanism, either by permitting the wheel to run slightly faster than the sprocket-wheel or other power-transmitting member or by holding the sprocket-wheel stationary in order to effect the desired change. This construction and arrangement has the advantage of permitting backward movement of the sprocket-wheel to be utilized for any other purpose, as for automatically throwing a brake on or off. It may be here noted that the wheel is free at all times to overrun its driving mechanism, and hence all the benefits of the style of wheel known as the "free" wheel also accrue from this construction—that is to say, at any time the bicycle is permitted to run entirely free or the driving mechanism to be rotated at a speed less than that required to engage the wheel for driving purposes.

I have shown in connection with the driving mechanism a brake mechanism adapted to be operated by a back-pedaling movement and have adapted the brake mechanism shown in United States patent to J. S. Copeland, No. 643,085, for this purpose.

I have provided a brake-actuating member 29, having a recess or recesses, a brake-band 30, and a brake-casing 31. In back pedaling the balls of the clutch 18 are adapted to enter the recess or recesses in the brake-actuating member 29 to cause the brake-band 30 to engage the brake-casing 31 upon the hub 16 with greater or less pressure in accordance with the force applied in back pedaling. In this embodiment of my invention I therefore obtain two driving speeds, a free wheel, and a hub-brake, all automatically controlled and operated by movements of the power-transmitting member.

In the construction shown in Figs. 7 to 11, inclusive, I have illustrated a construction in which I have obtained, in addition to the foregoing, means whereby back pedaling may, when desired, be applied directly against the forward movement of the wheel (instead of indirectly, as through braking mechanism) in the same manner as ordinary back-pedaling is applied to check or stop a wheel having directly-connected driving mechanism. In this embodiment of my invention the power-transmitting member or sprocket-wheel 22 is mounted upon the slow-speed sleeve 14, while the high-speed sleeve 15 is a short sleeve mounted directly upon the said sleeve 14 and carries a spur-gear 32. In fact, in this construction the high-speed sleeve 15 is in effect a mere hub of the said spur-gear 32. The hub 16 carries a gear-wheel 33, whose teeth mesh with the teeth of an intermediate gear-wheel 34. The intermediate gear-wheel 34 has secured thereto another intermediate gear-wheel 35 of different and preferably smaller diameter, the teeth of which engage the teeth of the gear-wheel 32. The gear-wheels 34 and 35 are mounted to rotate together about a stationary axle 36, secured to the frame of the machine. It is of course obvious that the gearing ratio may be changed from that shown or that the gear-wheel 35 may be larger than the gear-wheel 34, while the gear-wheel 34 may be smaller than the gear-wheel 33, so that the sleeve 14, carrying the sprocket-wheel 22, will become the high-speed sleeve, while the sleeve 15 will become the slow-speed sleeve. The sprocket-wheel 22 in this embodiment of my invention has secured thereto a shell 25, similar to the shell carried by the sprocket-wheel of the other figures. The shell 25 herein, however, is provided with internal ratchet-teeth 37. In place of the ball-retaining sleeve 27 carried on the outside of the high-speed sleeve 15 in the construction shown in Figs. 1 to 6, inclusive, a cam 38 is provided in the construction shown in Figs. 7 to 11, inclusive, which cam is arranged upon the interior of the slow-speed sleeve 14 and has intimate frictional engagement therewith at one end. At the other end it has a number of cam-like projections and depressions adapted to engage a locking-dog 39, carried by the shell 25. The locking-dog 39 is adapted to engage suitable recesses 40 in the high-speed sleeve 15 or in the gear-wheel 32, carried thereby, and is spring-actuated to cause such engagement. The cam 38, however, is so constructed and arranged as to force the locking-dog out of such engagement when in certain positions, owing to the engagement of the cam-like projections carried thereby with the locking-dog, as clearly shown in Fig. 9 of the drawings. The cam 38 is further provided with a pawl 41, arranged to engage the teeth 37 of the shell 25.

Overrunning of the wheel with respect to the driving mechanism will cause the sleeve 14 to move forwardly with respect to the sprocket-wheel 22, and as the cam 38 is, as before stated, in intimate frictional engagement therewith the cam will also move forwardly therewith. The shell 25, being fast to the sprocket-wheel, will have a relative movement with respect to the cam a distance sufficient to cause the pawl 41, carried by the cam, to engage the next succeeding tooth 37 of the shell 25. The movement will be limited by the length of the slot in the sleeve 14 through which the pin or key 23 plays, as in the construction previously described. When the driving mechanism is caused to again catch up with the wheel to be driven, the cam 38 is forced to move around with respect to the sleeve with which it frictionally engages a distance of one of the said ratchet-teeth 37. This will cause the uprising cam portions of the cam 38 to engage or disengage the dog 39 in order to force the same out of engagement with the gear-wheel 32 and high-speed sleeve 15 or to permit it to engage same under the influence of the spring provided for the purpose.

When the dog 39 is in locked engagement with the gear-wheel 32 and the high-speed sleeve 15, the wheel is driven from the power-transmitting member or sprocket-wheel 22 through the high-speed sleeve 15 and gear-wheel 32, so locked thereto, and through the intermediate gears 35 and 34 to the hub 16. At this time the slow-speed clutch 18 will be overrun, and hence inoperative as to any connection.

When the dog 39 is out of locked engagement with the high-speed sleeve 15 and the gear-wheel 32, driving connection is established between the slow-speed sleeve 14 and the hub 16 by the slow-speed clutch 18. The gearing 33, 34, 35, and 32 will still be connected together, but will run idly, the gear-wheel 32 at this time rotating freely upon the sleeve 14.

In changing from one speed to another in the mechanism just described it will be seen to be necessary to permit the wheel to first overrun the driving mechanism and then again to pick up such connection; but it will be seen that in overrunning no change is made to unlock or lock the high-speed sleeve to the power-transmitting member, but merely a movement to prepare for such locking or unlocking when the next forward movement of the driving mechanism is made with respect to the wheel. In other words, the pawl 41 is merely caused to pick up the next succeeding tooth in the overrunning movement, while during the movement to again engage the action of the pawl forces the cam around to lock or unlock the dog. For this reason it is possible to hold the driving mechanism in locked engagement with the wheel in both forward or driving movement and in back-pedaling or retarding movement, for when the driving mechanism is in locked engagement with the high-speed sleeve it will remain in such connection during the action of back pedaling, and it will only be upon the next succeeding movement forward that the locking device will be released and the driving connection changed from one gear speed to the other. In this embodiment of my invention I have then so constructed the parts that back-pedaling upon the slow speed will operate the brake-actuating member 29. The brake-actuating member 29 is in this instance adapted to apply a brake to the periphery or tire of the wheel. It may of course be a hub-brake, if desired.

By the foregoing it will be seen that by my invention I not only have a two-speed or change-speed gearing, but I also have a free wheel, a brake mechanism, and means for back pedaling through a locked engagement between the driving mechanism and the wheel, all operated and controlled by different movements of the power-transmitting mechanism.

I have shown a spring 42 between the power-transmitting member or sprocket-wheel 22 and the sleeve 14 in Fig. 7, so that the normal tendency of the parts will be to assume the position shown in Fig. 8 of the drawings. When driving pressure is applied to the sprocket-wheel, the resistance of the spring will of course be overcome and the pin or key 23 will be in the forward end of the slot in the sleeve. Whenever driving pressure is ceased to be applied to the power-transmitting member, the parts will immediately return to the position shown in Fig. 8. The spring is not essential, but may be employed, if desired.

It is obvious that many and varied changes may be made in the construction, arrangement, and combination of parts herein set forth without departing from the spirit and scope of my invention and that certain parts of my invention are adapted to be employed separately or with other parts of different construction. I do not, therefore, limit myself to the precise foregoing construction.

What I claim is—

1. In bicycle-gearing, the combination with three members, one of said members constituting a portion of a wheel to be driven, and the others driving members, of gearing connecting two of said members together to rotate at different relative speeds, clutch mechanism for connecting said members together in different speed relation, a power-transmitting member having a limited rotative movement with respect to one of said driving members, but operatively engaging same at the limit of such movement, and a clutch-controller rigidly connected to said power-transmitting member.

2. In bicycle-gearing, the combination with three members, one of said members constituting a portion of a wheel to be driven, and the others driving members, of gearing connecting two of said members together to rotate at different relative speeds, clutch mechanism for connecting said members together in different speed relation, a power-transmitting member having a limited rotative movement with respect to one of said driving members, but operatively engaging same at the limit of such movement, a spring normally tending to force the power-transmitting member toward the limit of its movement with respect to the driving member in one direction, and a clutch-controller rigidly connected to said power-transmitting member.

3. In bicycle-gearing, the combination with three members, one of said members constituting a portion of a wheel to be driven, and the others driving members, of gearing connecting two of said members together to rotate at different relative speeds, clutch mechanism for connecting said members together in different speed relation, a power-transmitting member having a limited rotative movement with respect to one of said driving members, but operatively engaging same at the limit of such movement, a clutch-controller rigidly connected to said power-transmitting member, a brake mechanism, and means controlled by a back-pedaling movement of the power-transmitting member for operating the brake mechanism.

4. In bicycle-gearing, the combination with a wheel, of a power-transmitting member, a driving member adapted to be actuated by the power-transmitting member, but with respect to which the said power-transmitting member has a limited movement, means for connecting the driving member and the wheel together to rotate at different relative rates of speed, and means controlled by the power-transmitting member in its movement with respect to the driving member, to change the driving connection between the driving member and the wheel from one relative speed to another.

5. In bicycle-gearing, the combination with a wheel, of a power-transmitting member, a driving member adapted to be actuated by the power-transmitting member, but with respect to which the said power-transmitting member has a limited movement, means for connecting the driving member and the wheel together to rotate at different relative rates of speed, means controlled by the power-transmitting member in its movement with respect to the driving member, to change the driving connection between the driving member and the wheel from one relative speed to another, a brake mechanism, and means controlled by a backward movement of the driving member for operating the brake mechanism.

6. In bicycle-gearing, the combination with a wheel, of a power-transmitting member, a driving-sleeve upon which the said power-transmitting member is mounted and with respect to which it has a limited rotative movement, means for connecting the driving-sleeve and the wheel together to rotate at different relative rates of speed, and means controlled by the power-transmitting member in its movement with respect to the driving-sleeve, to change the driving connection between the driving-sleeve and the wheel from one relative speed to another.

7. In bicycle-gearing, the combination with a wheel, of a power-transmitting member, a driving-sleeve upon which the said power-transmitting member is mounted and with respect to which it has a limited rotative movement, means for connecting the driving-sleeve and the wheel together to rotate at different relative rates of speed, means controlled by the power-transmitting member in its movement with respect to the driving-sleeve to change the driving connection between the driving-sleeve and the wheel from one relative speed to another, a brake mechanism, and means controlled by a backward movement of the driving-sleeve for operating the brake mechanism.

8. In bicycle-gearing, the combination with a wheel, of a power-transmitting member, a driving-sleeve upon which the said power-transmitting member is mounted and with respect to which it has a limited rotative movement, a secondary driving-sleeve, said driving-sleeves adapted to rotate at different relative rates of speed with respect to the wheel, means for operatively connecting either one sleeve or the other with the wheel, and means controlled by the power-transmitting member in its movement with respect to the driving member for changing from one connection to the other.

9. In bicycle-gearing, the combination with a wheel, of a power-transmitting member, a driving-sleeve upon which the said power-transmitting member is mounted and with respect to which it has a limited rotative movement, a secondary driving-sleeve, said driving-sleeves adapted to rotate at different relative rates of speed with respect to the wheel, means for operatively connecting either one sleeve or the other with the wheel, means controlled by the power-transmitting member in its movement with respect to the driving member for changing from one connection to the other, a brake mechanism, and means controlled by a backward movement of the driving-sleeve for operating the brake mechanism.

10. In bicycle-gearing, the combination with a wheel, of a power-transmitting member, a driving-sleeve upon which the said power-transmitting member is mounted and with respect to which it has a limited rotative movement, a secondary driving-sleeve, a train of gearing for the secondary driving-sleeve, means for connecting either the first-named driving-sleeve or the secondary driving-sleeve with the wheel, and means controlled by the power-transmitting member in its movement with respect to the driving-sleeve upon which it is mounted to change the driving connection with the wheel from one to the other of the said sleeves.

11. In bicycle-gearing, the combination with a wheel and a power-transmitting member therefor, of two driving members geared to rotate at different relative speeds, clutches between the driving members and the wheel, and a clutch-controller rigidly secured to the power-transmitting member, said power-transmitting member having a limited rotative movement with respect to one of said driving members, but operatively engaging same at the limit of such movement.

12. In bicycle-gearing, the combination with a wheel and a power-transmitting member therefor, of two driving members geared to rotate at different relative speeds, clutches operatively connecting either one or other of said driving members with the wheel, and a clutch-controller for one of said clutches rigidly secured to the power-transmitting member, said power-transmitting member having a limited rotative movement with respect to one of said driving members, but operatively engaging same at the limit of such movement.

13. In bicycle-gearing, the combination with a wheel-hub and two driving-sleeves concentric therewith, and change-speed gearing therefor, of a sprocket-wheel mounted upon one of said sleeves and having a limited rotative movement with respect thereto, a clutch mechanism between the sleeves and the wheel-hub, and clutch-controlling means rigidly secured to the sprocket-wheel.

14. In bicycle-gearing, the combination with a wheel and a power-transmitting member therefor, of means for operatively connecting the power-transmitting member with the wheel in either driving or overrunning relation, means for operatively connecting the power-transmitting member with the wheel at different driving speeds, and means operated by the power-transmitting member for changing from one driving speed to another.

15. In bicycle-gearing, the combination with a wheel and a power-transmitting member therefor, of means for operatively connecting the power-transmitting member with the wheel in either driving or overrunning relation, means for operatively connecting the power-transmitting member with the wheel at different driving speeds, and means operated by the power-transmitting member for changing from one driving speed to another, and for freeing the wheel from driving connection with the power-transmitting member.

16. In bicycle-gearing, the combination with a wheel and a power-transmitting member therefor, of means for operatively connecting the power-transmitting member with the wheel in either driving or overrunning relation, means for operatively connecting the power-transmitting member with the wheel at different driving speeds, means operated by the power-transmitting member for changing from one driving speed to another, and for freeing the wheel from driving connection with the power-transmitting member, brake mechanism, and means controlled by a back-pedaling movement of the power-transmitting mechanism for operating the brake mechanism.

CHARLES S. THOMPSON.

Witnesses:
CHARLES F. THOMPSON,
M. M. CONOVER.